US012298683B2

(12) United States Patent
Watanabe et al.

(10) Patent No.: US 12,298,683 B2
(45) Date of Patent: May 13, 2025

(54) IMAGE FORMING APPARATUS THAT DETERMINES A CORRECTION VALUE FOR CORRECTING AN IMAGE POSITION WHEN AN ADJUSTMENT IMAGE IS PRESENT AND THAT SELECTS AN IMAGE BEARING CONTACT MODE

(71) Applicant: CANON KABUSHIKI KAISHA, Tokyo (JP)

(72) Inventors: Naoto Watanabe, Chiba (JP); Takuya Hayakawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/338,167

(22) Filed: Jun. 20, 2023

(65) Prior Publication Data

US 2023/0418186 A1 Dec. 28, 2023

(30) Foreign Application Priority Data

Jun. 23, 2022 (JP) ................................ 2022-101298

(51) Int. Cl.
*G03G 15/16* (2006.01)

(52) U.S. Cl.
CPC ................................ *G03G 15/1605* (2013.01)

(58) Field of Classification Search
USPC ........................................................... 399/66
See application file for complete search history.

(56) References Cited

U.S. PATENT DOCUMENTS

| | | | | | |
|---|---|---|---|---|---|
| 6,029,023 | A | 2/2000 | Munemori | | |
| 7,760,370 | B2 | 7/2010 | Oki | | |
| 2010/0239294 | A1* | 9/2010 | Kosako | G03G 15/0136 | 399/121 |
| 2010/0302569 | A1* | 12/2010 | Enami | G03G 15/0178 | 358/1.12 |
| 2010/0303512 | A1* | 12/2010 | Kamekura | G03G 15/161 | 399/301 |
| 2011/0058823 | A1* | 3/2011 | Hirai | G03G 15/5058 | 399/72 |
| 2011/0116818 | A1* | 5/2011 | Yashima | G03G 15/0194 | 399/45 |
| 2014/0270819 | A1* | 9/2014 | Wada | G03G 15/553 | 399/29 |
| 2016/0098005 | A1* | 4/2016 | Kobayashi | G03G 15/0131 | 399/301 |

* cited by examiner

*Primary Examiner* — Quana Grainger
(74) *Attorney, Agent, or Firm* — Canon U.S.A., Inc. I.P. Division

(57) ABSTRACT

An image forming apparatus includes a first image forming unit to form a first image of a chromatic color, a second image forming unit to form a second image of an achromatic color, a transfer unit, a reading unit, a switching unit to switch a first mode and a second mode, and a controller. In a case where an adjustment image for adjusting an image forming position is fixed to a sheet and the adjustment image fixed to the sheet is read by the reading unit, the controller performs a determining process to determine a correction value for correcting the image forming position based on a reading result of the reading unit. In a case where the controller is set to form the second image without forming the first image and the controller is set to perform the determining process, the controller forms the second image in the first mode.

18 Claims, 9 Drawing Sheets

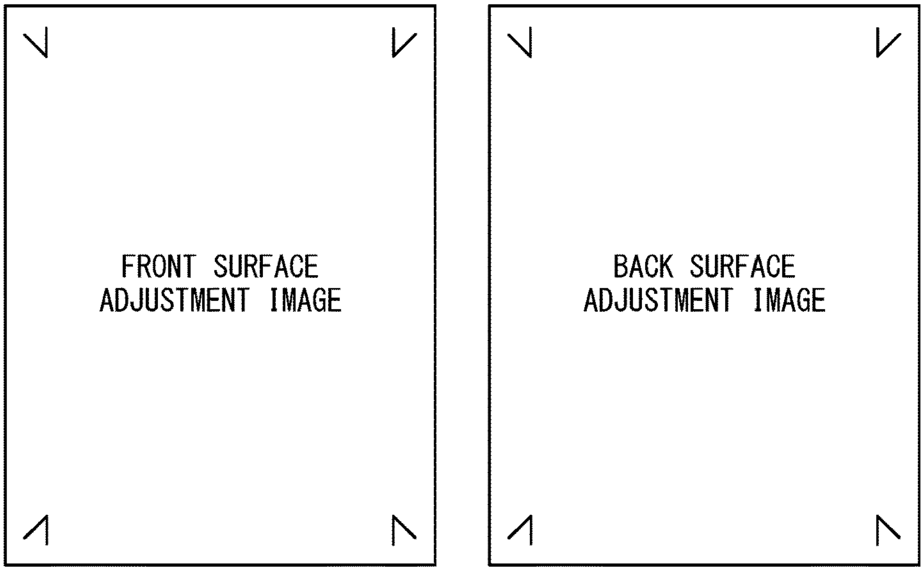
FIG. 8
FIG. 9A
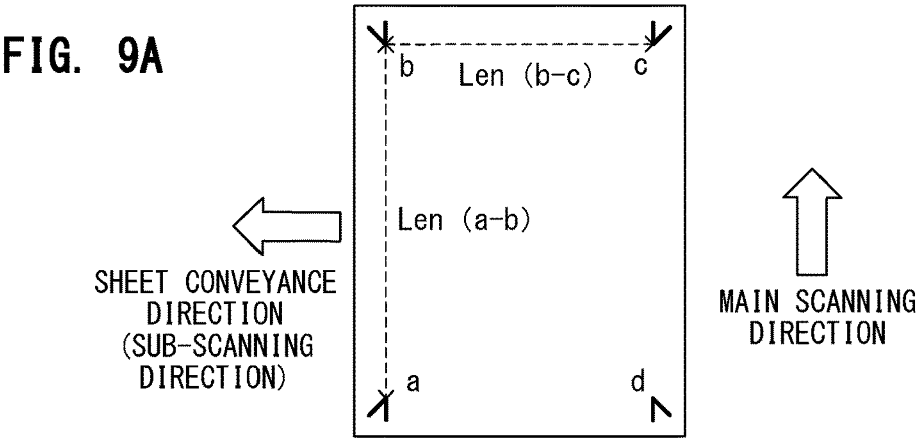
FIG. 9B
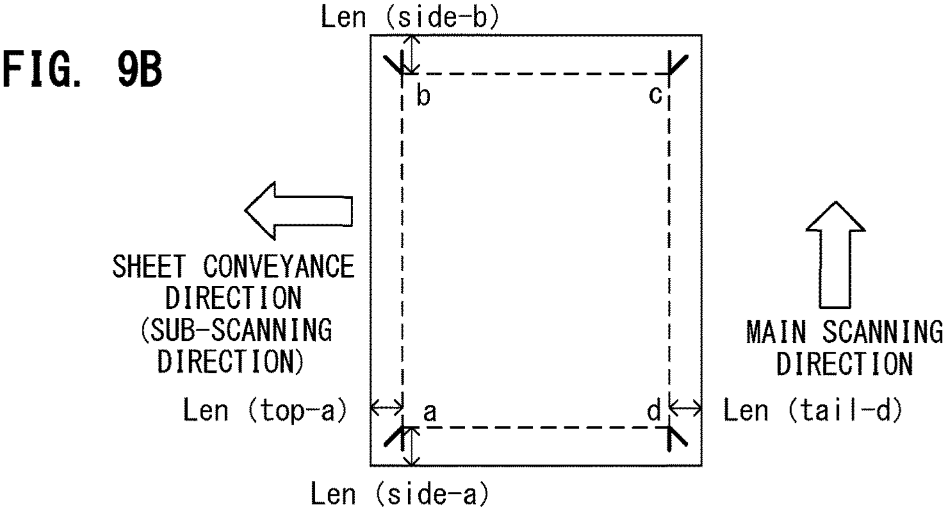

IMAGE FORMING APPARATUS THAT DETERMINES A CORRECTION VALUE FOR CORRECTING AN IMAGE POSITION WHEN AN ADJUSTMENT IMAGE IS PRESENT AND THAT SELECTS AN IMAGE BEARING CONTACT MODE

BACKGROUND

Field of the Disclosure

The present disclosure relates to an image forming apparatus, such as a printer, a copying machine, a facsimile machine, or a multifunction apparatus.

Description of the Related Art

As to printed matters printed by a commercial printing machine, in the case of double-sided printing, it is desirable to stabilize printing position accuracy for both of a back surface and a front surface of a sheet. U.S. Pat. No. 7,760,370 describes an image forming apparatus directed to stabilize printing position accuracy. For stabilization of the printing position accuracy, this image forming apparatus prints an adjustment image, which serves as a printing position mark, on a sheet to create an adjustment chart. As to the adjustment chart, the adjustment image is read by an image reading sensor provided in a sheet conveyance path. The image forming apparatus feeds back the reading result of the image for adjustment to an image forming condition, and adjusts geometric characteristics of an image, such as a printing position and inclination of the image.

One type of the image forming apparatus that prints a full color image is a tandem type. In the tandem type image forming apparatus, a plurality of photosensitive members is arranged with respect to an intermediate transfer member, and the image forming apparatus of the tandem type performs multi-transfer of the toner images from each photosensitive member in sequence onto the intermediate transfer member. For example, four photoconductors are provided corresponding to four colors of yellow (Y), magenta (M), cyan (C), and black (K). From four photosensitive members, a full color toner image is formed on the intermediate transfer member by performing the multi-transfer of the toner images of yellow, magenta, cyanogen, and black being performed. The toner images of each color are collectively transferred on a sheet from the intermediate transfer member. By performing a fixing process of the toner images by a fixing unit, the full color image is printed on the sheet. Hereinafter, yellow, magenta, cyan, and black may be indicated as Y, M, C, and K.

In the tandem type image forming apparatus, a separation mechanism is provided to separate or contact the photosensitive members of Y, M, C, and the intermediate transfer member. In a case where a monochrome image is to be printed, the photosensitive member and the intermediate transfer members of Y, M, and C, which are not necessary for printing the monochrome image, are separated and the drive of the photosensitive member of Y, M, and C is stopped. A print mode for printing the monochrome image is called "K print mode". In a case where the color image is to be printed, the intermediate transfer members and all the photosensitive members of Y, M, C, and K are contacted. The print mode for printing the color image is called "YMCK print mode". The image forming apparatus described in U.S. Pat. No. 6,029,023 includes such a separation mechanism and performs printing in K-printing mode as necessary, when printing monochrome images. Therefore, the progression of aging of the photosensitive members of Y, M, and C is suppressed to achieve a reduction in running costs.

Specifically, in the separation mechanism described with reference to U.S. Pat. No. 6,029,023, the separation of the photosensitive member and the intermediate transfer member is controlled by moving a transfer unit that transfers the toner image from the photosensitive member to the intermediate transfer member. The transfer unit is arranged opposite to the photosensitive member with the intermediate transfer member in between. Further, a plurality of transfer units are provided corresponding to a plurality of photosensitive members. The intermediate transfer member and the photosensitive member of K always contacts irrespective of the color to print. Therefore, the separation mechanism does not control the transfer unit of K which corresponds to the photosensitive member of K.

Except for the transfer unit of K, each of the transfer units of Y, M, and C moves in a direction toward the photosensitive member in a case where the photosensitive member and the intermediate transfer member are to be contacted, and moves in a direction away from the photosensitive member in a case where the photosensitive member and the intermediate transfer member are to be separated. In a case where the color image is to be printed, the transfer units of Y, M, and C, which correspond to the photosensitive members of Y, M, and C, respectively, move in the direction toward the photosensitive member to thereby contact the intermediate transfer member to the photosensitive members of Y, M, and C. This state is called "YMCK contact state". In a case where the monochrome image is to be printed, the transfer units of Y, M, and C, which correspond to the photosensitive members of Y, M, and C, respectively, do not move in the direction toward the photosensitive member, and the intermediate transfer member is separated from the photosensitive members of Y, M, and C. Therefore, only the photosensitive member of K contacts to the intermediate transfer member. This state is called "K contact state".

The following describes a case where the image forming apparatus includes a drum-shaped photosensitive drum as a photosensitive member, an endless belt-like intermediate transfer belt as an intermediate transfer member, and a transfer roller as a transfer unit. The YMCK contact state and the K contact state differ in the number of the transfer rollers that contact the intermediate transfer belt. Therefore, the tension acting on the intermediate transfer belt with a transfer roller in the YMCK contact state is different from the tension acting on the intermediate transfer belt with a transfer roller in the K contact state. Such a tension change causes, between the YMCK contact state and the K contact state, a change in a time it takes for the toner images formed on the photosensitive drums to reach a transfer position to the sheet. Specifically, in the K contact state, the time becomes late rather than in the YMCK contact state. Therefore, when printing the same monochrome image in the YMCK contact state and the K contact state, in a conveyance direction of the sheet, a distance from a sheet tip position to an image in the K contact state is longer than that in the YMCK contact state.

Since the position of the adjustment image on the sheet is different in the YMCK contact state and in the K contact state, a correction value for correcting an image forming condition is different in the YMCK contact state and in the K contact state. For example, in the case of correcting geometric characteristics, such as an image printing position, as image forming conditions, the correction value is different in the YMCK contact state and in the K contact state. In this case, in a case where double-sided printing of the monochrome image is performed using the correction value of the geometric characteristic generated in the YMCK contact state, correction accuracy of the geometric characteristic of each image of a front surface and a back surface will decrease as compared with that in the double-sided printing of the color image.

SUMMARY

According to an aspect of the present disclosure, an image forming apparatus includes a first image forming unit configured to form a first image of a chromatic color on a first image bearing member, a second image forming unit configured to form a second image of an achromatic color on a second image bearing member, an intermediate transfer member onto which the first image formed on the first image bearing member and the second image formed on the second image bearing member are to be transferred, a transfer unit configured to transfer an image transferred onto the intermediate transfer member onto a sheet, a fixing unit configured to fix the image transferred onto the sheet to the sheet, a reading unit configured to read the image fixed to the sheet, a switching unit configured to switch a first mode and a second mode, the first mode being a mode in which the intermediate transfer member and both the first image bearing member and the second image bearing member are in a contact state, and the second mode being a mode in which the first image bearing member and the intermediate transfer member are separated and the second image bearing member and the intermediate transfer member are in a contact state, and a controller configured to perform, in a case where an adjustment image for adjusting an image forming position is fixed to the sheet and the adjustment image fixed to the sheet is read by the reading unit, a determining process to determine a correction value for correcting the image forming position based on a reading result of the reading unit, wherein the controller is configured to form, in a case where the controller is set to form the second image without forming the first image and the controller is set to perform the determining process, the second image in the first mode.

Further features of the present disclosure will become apparent from the following description of exemplary embodiments (with reference to the attached drawings).

BRIEF DESCRIPTION OF THE DRAWINGS

FIG. 8 is an exemplary diagram of an adjustment image.

FIG. 9A and FIG. 9B are explanatory diagrams of a method of calculating the front and back position correction value.

DESCRIPTION OF THE EMBODIMENTS

Now, embodiments of the present disclosure are described in detail with reference to the drawings.

<Image Processing System>

Figure 1:
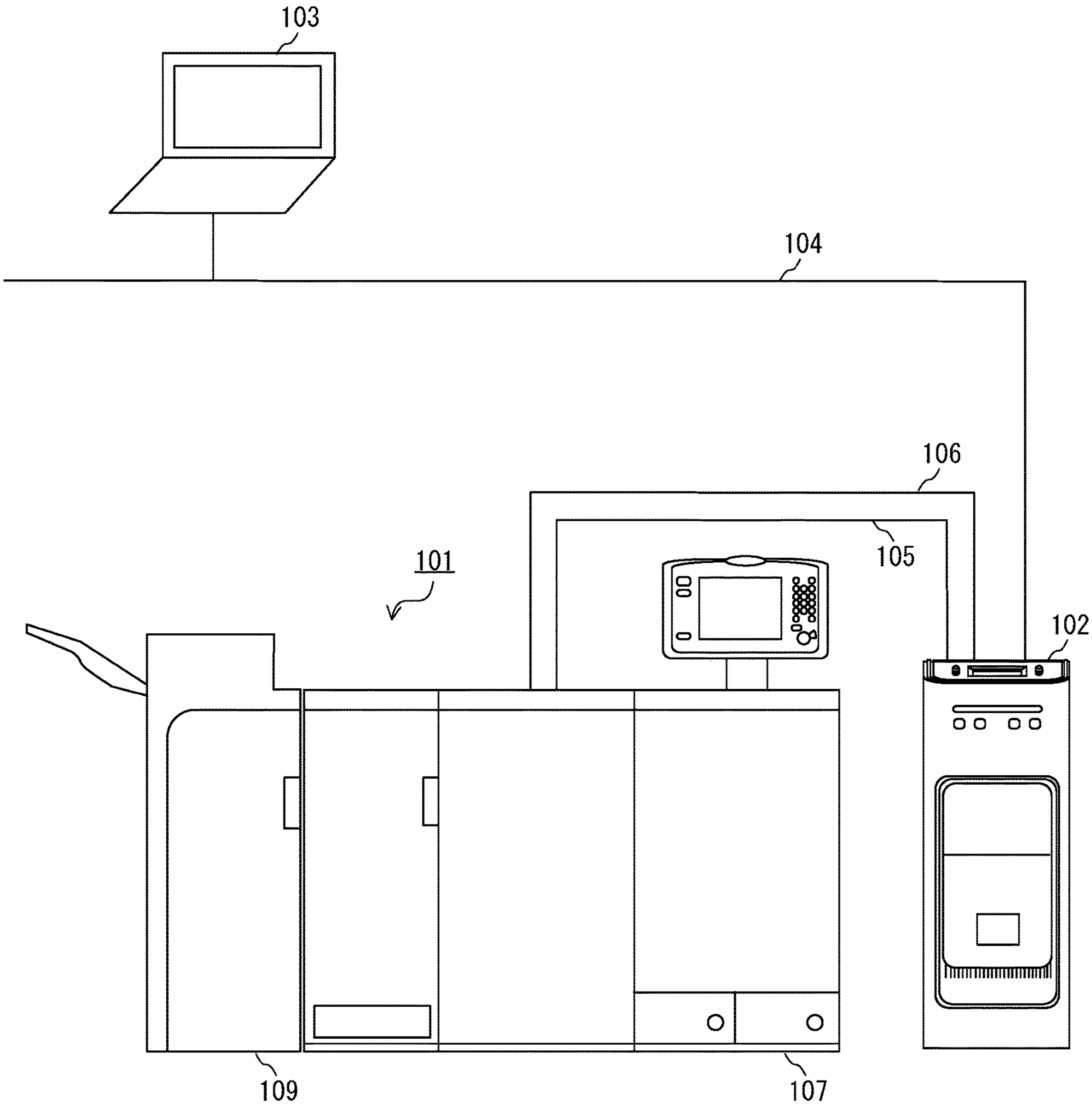
FIG. 1 is a configuration diagram of an image processing system.

FIG. 1 is a configuration diagram of an image processing system including an image forming apparatus according to a first embodiment of the present disclosure. The image processing system includes an image forming apparatus 101 and an external controller 102. The image forming apparatus 101 is a multifunction apparatus, a multifunction peripheral (MFP) or the like, for example. The external controller 102 is an image processing controller, a digital front end (DFE), a print server or the like, for example.

The image forming apparatus 101 and the external controller 102 are communicably connected via an internal LAN (Local Area Network) 105 and a video cable 106. The external controller 102 is connected to a client PC (Personal Computer) 103 via an external LAN 104. The external controller 102 obtains a print instruction (print job) from the client PC 103.

A printer driver, having a function of converting image data into a print description language which can be processed by the external controller 102, is installed in the client PC 103. A user can issue an instruction for printing by various applications via the printer driver. The printer driver transmits a print job including image data to the external controller 102 based on an instruction from a user. The external controller 102 receives the print job including the image data from the client PC 103 to perform data analysis and a rasterizing process, and instruct the image forming apparatus 101 to perform printing (image forming) based on the image data.

The image forming apparatus 101 is configured by connecting a plurality of devices, each having different functions, including a printing apparatus 107. Further, the image forming apparatus 101 can perform a complicated printing process such as bookbinding. The image forming apparatus 101 of the present embodiment includes the printing apparatus 107 and a finisher 109. The printing apparatus 107 uses a developing agent (for example, toner) to form an image on the sheet fed from a sheet feeding unit provided in a lower part of a main body. The printing apparatus 107 forms a yellow (Y), magenta (M), cyan (C), and black (K) image. On the sheet, a full-color image in which images of each color are superimposed and a monochrome image using black (K) can be formed. The sheet on which the image is formed is conveyed from the printing apparatus 107 to the finisher 109. The finisher 109 loads the sheet on which the image is formed.

In the configuration of the image processing system of this embodiment, the external controller 102 is connected to the image forming apparatus 101, however, the external controller 102 may be omitted. The image forming apparatus 101 may be configured to directly obtain the print job including image data from the client PC 103 via the external LAN 104. In this case, data analysis processing and rasterization processing, which are performed by the external controller 102, are performed by the image forming apparatus 101. That is, the image forming apparatus 101 and the external controller 102 will be constituted as a single unit.

<System Configuration>

Figure 2:
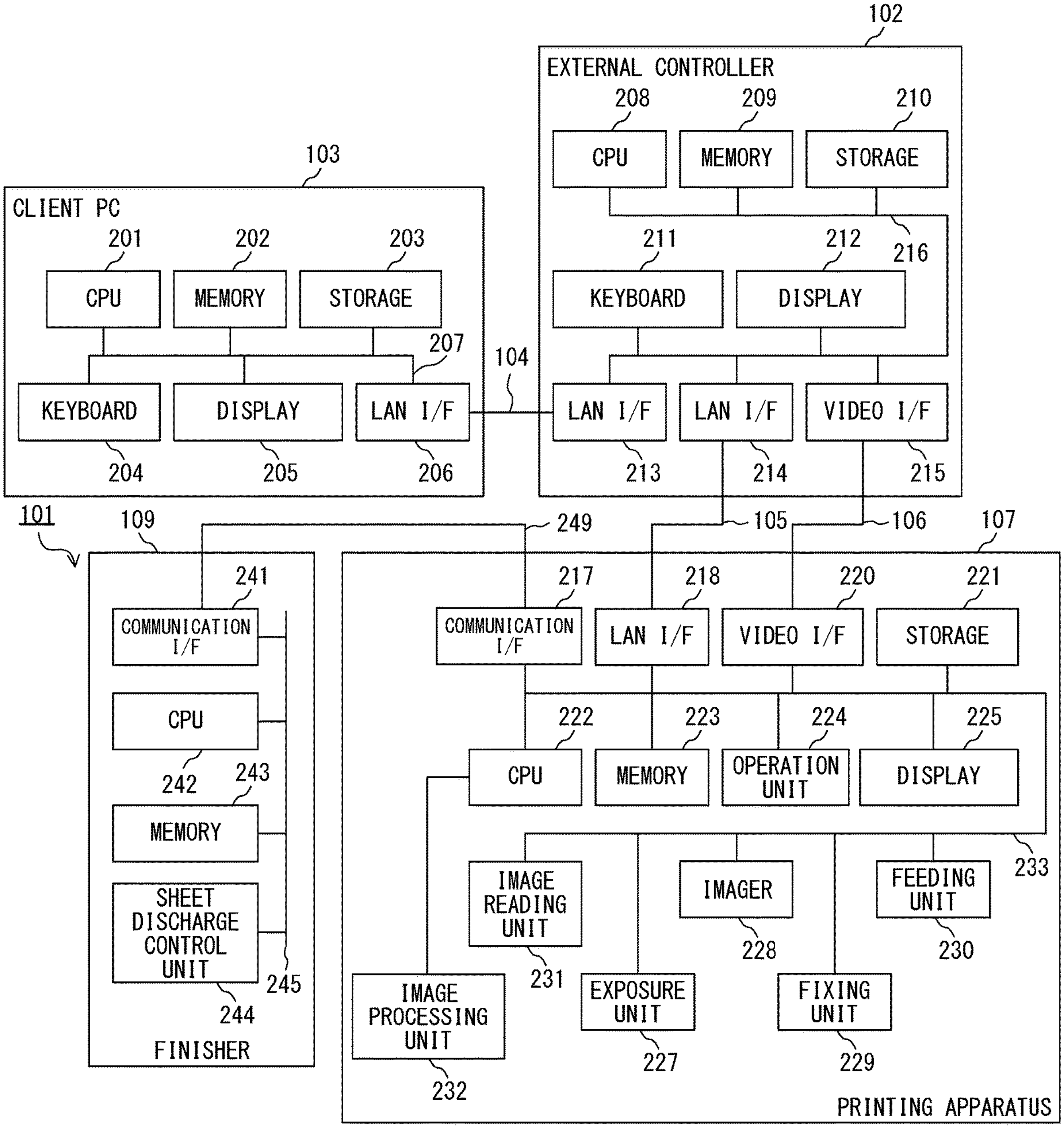
FIG. 2 is a configuration diagram of a system.

FIG. 2 is a system configuration diagram for controlling the operation of the image processing system. Hereinafter, each of the image forming apparatus 101, the external controller 102, and the client PC 103 is explained.

Printing Device

In order to communicate with other devices, the printing apparatus 107 includes a communication interface (I/F) 217, a LAN I/F 218, and a video I/F 220. In order to control the operation of the printing apparatus 107, the printing apparatus 107 includes a Central Processing Unit (CPU) 222, a memory 223, a storage 221, an image reading unit 231, and an image processing unit 232. The printing apparatus 107 includes, for forming an image, an exposure unit 227, an image formation unit 228, a fixing unit 229, and feeding unit 230. The printing apparatus 107 includes an operation unit 224 and a display 225, each for a user interface. These components are communicably connected to each other via the system bus 233.

The communication I/F 217 is connected to the finisher 109 via a communication cable 249 to control communication with the finisher 109. In a case where the printing apparatus 107 cooperates with the finisher 109, information and data are transmitted and received via the communication I/F 217. The LAN I/F 218 is connected to the external controller 102 via the internal LAN 105 to control communication with the external controller 102. The printing apparatus 107 receives a print setting from the external controller 102 through the LAN I/F 218. The video I/F 220 is connected to the external controller 102 via the video cable 106 to control communication with the external controller 102. The printing apparatus 107 receives image data representing an image to be formed from the external controller 102 via the video I/F 220.

The CPU 222 controls image processing and printing by executing a computer program stored in the storage 221. The memory 223 provides a work area for the CPU 222 to execute various processes. When performing an image forming process, the CPU 222 controls the exposure unit 227, the image formation unit 228, the fixing unit 229, and the feeding unit 230.

The exposure unit 227 includes a photosensitive member, a charging wire for charging the photosensitive member, and a light source for exposing the photosensitive member, etc. The photoconductor is, for example, a photosensitive belt having a photosensitive layer formed on a surface of a belt-shaped elastic member, or a photosensitive drum having a photosensitive layer formed on a surface of a cylinder, or the like. Further, a charging roller may be used instead of the charging wire. The exposure unit 227 charges a surface of the photosensitive member in uniform negative potential with the charging wire. The exposure unit 227 outputs laser light based on the image data from the light source. The laser light scans the uniformly charged surface of the photoconductor. Therefore, on the photoconductor, a potential at a position at which the laser beam is irradiated varies to thereby form an electrostatic latent on the surface. Four photoconductors are provided corresponding to the four colors of yellow (Y), magenta (M), cyan (C), and black (K). Electrostatic latent images corresponding to images of different colors are formed on each of the four photoconductors.

The image formation unit 228 transfers the toner image formed on the photosensitive member onto the sheet. The image formation unit 228 includes a developing unit, a transfer unit, a toner supply unit, and the like. The developing unit forms the toner image by adhering, from a development cylinder, toner charged in negative polarity onto the electrostatic latent image formed on the surface of the photosensitive member. Four developing units are provided corresponding to the four colors of yellow (Y), magenta (M), cyan (C), and black (K). The developing unit visualizes the electrostatic latent image on the photosensitive member with the toner of the corresponding color.

The transfer unit includes an intermediate transfer belt, which is an intermediate transfer member, and transfers the toner image from the photoconductor onto the intermediate transfer belt. At a position opposing to the photoconductor, with the intermediate transfer belt in between, a primary transfer roller is provided. By applying a positive potential to the primary transfer roller, from each of the four photoconductors, the toner image is sequentially superimposed and transferred on the intermediate transfer belt. In this way, a full-color toner image is formed on the intermediate transfer belt. The toner image formed on the intermediate transfer belt is transferred onto the sheet by a secondary transfer roller described below. The secondary transfer roller transfers, by applying a positive potential, a full-color toner image is transferred from the intermediate transfer belt onto the sheet.

The fixing unit 229 fixes the transferred toner image onto the sheet. The fixing unit 229 includes a heater and a roller pair. The fixing unit 229 melts and fixes the toner images on the sheet by heating and pressurizing the toner images on the sheet by the heater and the roller pair. Thus, the image is formed on the sheet to generate printed matter. To control feeding operations of the sheet, the feeding unit 230 is provided with a feeding roller and various sensors in its feeding path.

The image reading unit 231 reads the image printed on the conveyed sheet based on an instruction from the CPU 222. When adjusting the image forming conditions, for example, the CPU 222 reads an adjustment image, which is formed on the sheet, using the image reading unit 231. The operation unit 224 is an input device which receives input of various settings and operation instructions from the user. The operation unit 224 may be an input key of any type or a touch panel. The display 225 is an output device which displays setting information of the image forming apparatus 101 and a processing status (Status information) of the print job, and the like.

Finisher

The finisher 109 performs post-processing to the printed matter output, for example, from the printing apparatus 107. The finisher 109 includes a communication I/F 241, a CPU 242, a memory 243, and a sheet discharge control unit 244. These components are communicably connected to each other via the system bus 245. The communication I/F 241 is connected to the printing apparatus 107 via a communication cable 249 to control communication with the printing apparatus 107. In a case where the finisher 109 cooperates with the printing apparatus 107, information and data are transmitted and received via the communication I/F 241. The CPU 242 executes a control program stored in the memory 243 and performs various controls necessary for the post processing. The memory 243 stores the control program. The memory 243 also provides a work area for the CPU 242 to execute various processes. The sheet discharge control unit 244 performs, based on the instruction from the CPU 242, the post processing to the conveyed sheet to discharge the same.

External Controller

The external controller 102 includes a LAN I/F 213, a LAN I/F 214, and a video I/F 215 in order to communicate with other devices. The external controller 102 includes a CPU 208, a memory 209, and a storage 210 to control the operation of the external controller 102. The external controller 102 includes a keyboard 211 and a display 212, as user interfaces. These components are communicably connected to each other via the system bus 216.

The LAN I/F 213 is connected to the client PC 103 via the external LAN 104 and controls communication with the client PC 103. The external controller 102 obtains the print job from the client PC 103 via LAN I/F 213. The LAN I/F 214 is connected to the printing apparatus 107 via the internal LAN 105 to control communication with the printing apparatus 107. The external controller 102 transmits the print setting to the printing apparatus 107 via the LAN I/F 214. The video I/F 215 is connected to the printing apparatus 107 via the video cable 106 to control communication with the printing apparatus 107. The external controller 102 transmits the image data to the printing apparatus 107 via the video I/F 215.

By executing the computer program stored in the storage 210, the CPU 208 comprehensively performs processing such as receiving the image data transmitted from the client PC 103, RIP processing, and transmission of the image data to the image forming apparatus 101. The memory 209 provides a work area for the CPU 208 to execute various processes. The keyboard 211 is an input device which receives input of various settings and operation instructions from the user. The display 212 is an output device which displays information of an execution application of the external controller 102, as a still image or a moving image.

Client PC

The client PC 103 includes a CPU 201, a memory 202, a storage 203, a keyboard 204, a display 205, and a LAN I/F 206. These components are communicably connected to each other via the system bus 207.

By executing the computer program stored in the storage 203, the CPU 201 controls an operation of the client PC 103. In the present embodiment, the CPU 201 creates the image data and transmits print job. The memory 202 provides a work area for the CPU 201 to execute various processes. The keyboard 204 and the display 205 are user interfaces. The keyboard 204 is an input device which receives instructions from the user. The display 205 is an output device which displays information, such as an execution application of the client PC 103, as a still image or a moving image. The LAN I/F 206 is connected to the external controller 102 via the external LAN 104 to control communication with the external controller 102. The client PC 103 transmits the print job including the image data to the external controller 102 via the LAN I/F 206.

The external controller 102 and the image forming apparatus 101 are connected by the internal LAN 105 and the video cable 106. However, other configurations may be used as long as data necessary for printing can be transmitted and received, for example, these devices may be connected only via video cable 106. Each of the memory 202, the memory 209, the memory 223, and the memory 243 may be a storage device for holding data or programs, respectively. As to these memories, a volatile Random Access Memory (RAM), a non-volatile Read Only Memory (ROM), a storage device, a Universal Serial Bus (USB) memory, and the like may be used.

<Configuration of Image Forming Apparatus>

Figure 3:
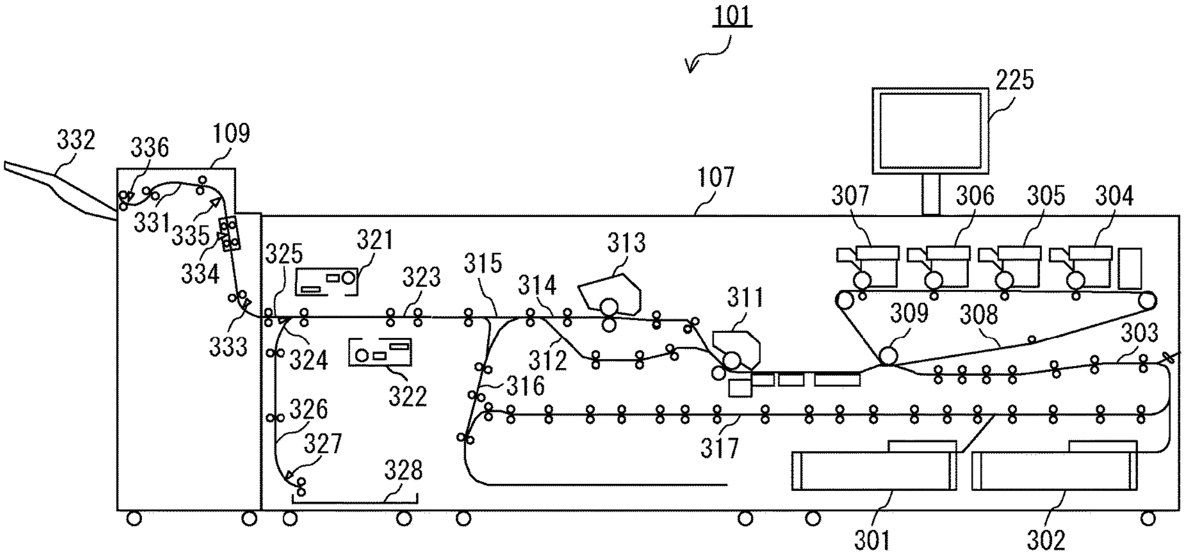
FIG. 3 is a configuration diagram of an image forming apparatus.

FIG. 3 is a configuration diagram of the image forming apparatus 101. On an upper portion of the printing apparatus 107, the display 225 is provided. The display 225 displays a processing status of the image forming apparatus 101 and information concerning the image forming apparatus 101. The sheet (printed matter) on which the image is formed using the printing apparatus 107 is conveyed to the finisher 109 arranged downstream.

The printing apparatus 107 includes, as the feeding unit 230, two or more sheet feeding decks 301 and 302 and conveyance path 303. Different types of sheets can be accommodated in the sheet feeding decks 301 and 302. As to the sheets accommodated in the sheet feeding decks 301 and 302, the topmost sheet is separated and fed to the conveyance path 303. The printing apparatus 107 includes, as the exposure unit 227, image forming units 304, 305, 306, and 307 for forming an image. The printing apparatus 107 can form a color image. Thus, the image forming unit 304 forms a black (K), which is achromatic color, image (toner image). The image forming unit 305 forms a cyan (C), which is chromatic color, image (toner image). The image forming unit 306 forms a magenta (M), which is chromatic color, image (toner image). The image forming unit 307 forms a yellow (Y), which is chromatic color, image (toner image).

The printing apparatus 107 includes, as the image formation unit 228, a secondary transfer roller 309 and an intermediate transfer belt 308 onto which the toner image is transferred from each of the image forming units 304, 305, 306, and 307. The intermediate transfer belt 308 rotates clockwise in FIG. 3, to superimpose and transfer the toner images from the image forming unit 307, the image forming unit 306, the image forming unit 305, and the image forming unit 304 in this order. In this way, a full-color toner image is formed on the intermediate transfer belt 308. The intermediate transfer belt 308 rotates to convey the toner image to the secondary transfer roller 309. The sheet is conveyed toward the secondary transfer roller 309 in synchronization with the timing when the toner image is conveyed to the secondary transfer roller 309. The secondary transfer roller 309 transfers the toner image on the intermediate transfer belt 308 on the conveyed sheet.

Figure 4A:
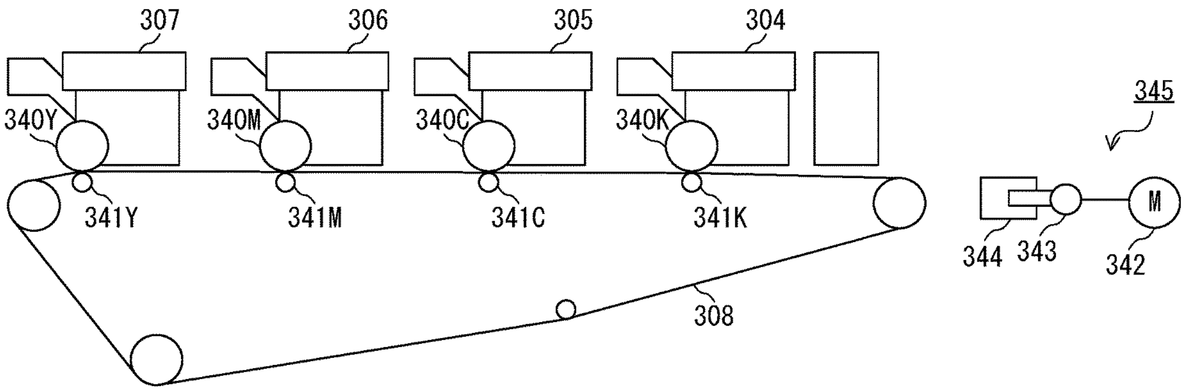
FIG. 4A and FIG. 4B are explanatory diagrams of an image forming unit and an intermediate transfer belt in a contact state.
Figure 4B:
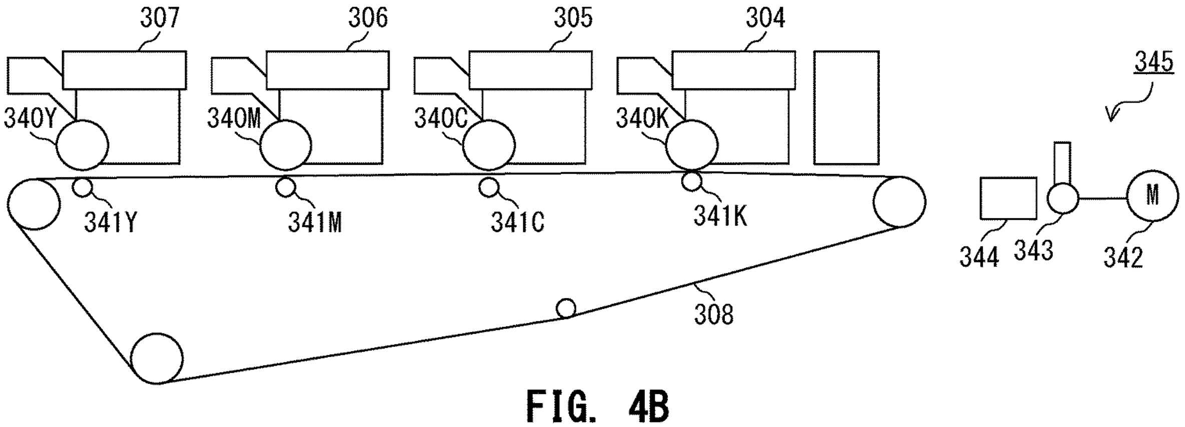

FIG. 4A and FIG. 4B are explanatory diagrams of the image forming units 304, 305, 306, and 307 and the intermediate transfer belt 308 in a contact state. The printing apparatus 107 of the present embodiment includes a separation mechanism 345 which controls a separate state and a contact state of the image forming units 304, 305, 306, and 307 and the intermediate transfer belt 308. The image forming units 304, 305, 306, and 307 includes drum shaped photosensitive drums 340Y, 340M, 340C, and 340K as photosensitive members. As described above, the photosensitive drums 340Y, 340M, 340C, and 340K form the electrostatic latent image by scanning a laser beam. A main scanning direction of the laser light is a drum axis direction of the photosensitive drums 340Y, 340M, 340C, and 340K, and is orthogonal to a conveyance direction of the sheet. The intermediate transfer belt 308 is an endless belt like transfer member. Primary transfer rollers 341Y, 341M, 341C, and 341K, which are transfer units, are respectively arranged at positions opposite to the photosensitive drums 340Y, 340M, 340C, and 340K with the intermediate transfer belt 308 in between.

The separation mechanism 345 includes a separation motor 342 used as a drive source, a separation sensor flag 343 driven by the separation motor 342 to rotate, and a separation home position sensor 344. The driving force output from the separation motor 342 is transmitted to the primary transfer rollers 341Y, 341M, and 341C via a predetermined transmission mechanism. The primary transfer rollers 341Y, 341M, and 341C move, due to the transmitted driving force, toward the photosensitive drum 340Y, 340M, and 340C or move away from the photosensitive drum 340Y, 340M, and 340C. As the primary transfer rollers 341Y, 341M, and 341C move toward the photosensitive drum 340Y, 340M, and 340C, the photosensitive drum 340Y, 340M, and 340C contact the intermediate transfer belt 308. As the primary transfer rollers 341Y, 341M, and 341C move away from the photosensitive drum 340Y, 340M, and 340C, the photosensitive drum 340Y, 340M, and 340C is separated from the intermediate transfer belt 308. When the primary transfer rollers 341Y, 341M, and 341C are moved, it is determined whether the primary transfer rollers 341Y, 341M, and 341C are in the contact position or in a separate position by using the separation sensor flag 343 and the separation home position sensor 344. In this configuration, positions of the primary transfer rollers 341Y, 341M, and 341C are determined appropriately.

FIG. 4A illustrates a state (YMCK contact state) where all the photosensitive drums 340Y, 340M, 340C, and 340K are in contact with the intermediate transfer belt 308. In the YMCK contact state, printing of the full color image is possible. Moreover, printing of the monochrome image is also possible by stopping the operation of the image forming units 305, 306, and 307 in the YMCK contact state. FIG. 4B illustrates a state (K contact state) in which only the photosensitive drum 340K is in contact with the intermediate transfer belt 308, and the photosensitive drums 340Y, 340M, and 340C are separated from the intermediate transfer belt 308. In the K contact state, printing of the monochrome image is possible. The separation mechanism 345 switches between the YMCK contact state and the K contact state.

The printing apparatus 107 includes, as the fixing unit 229, a first fixing unit 311 and a second fixing unit 313. The first fixing unit 311 and the second fixing unit 313 have the same configuration and fix the toner image on the sheet. Therefore, each of the first fixing unit 311 and the second fixing unit 313 includes a pressure roller and a heat roller, respectively. The sheet is heated and pressurized by passing between the pressure roller and the heat roller, thereby the toner image is melted and crimped. The sheet, after passing through the second fixing unit 313, is conveyed to the conveyance path 314. The second fixing unit 313 is arranged downstream of the first fixing unit 311 in a sheet conveyance direction. The second fixing unit 313 is used for adding gloss to the image on the sheet which is fixed by the first fixing unit 311 to improve fixing characteristics. Therefore, the second fixing unit 313 may be omitted depending on the type of the sheet and/or the content of the image forming process. A conveyance path 312 is provided in order to convey the sheet, on which a fixing process is performed by the first fixing unit 311, without passing the sheet through the second fixing unit 318.

A conveyance path 315 and a reverse path 316 are arranged on the downstream side of a point where the conveyance path 314 and the conveyance path 312 are merged. In a case where the double-sided printing is instructed, the sheet is conveyed to the reverse path 316. In the reverse path 316, a sheet conveyance direction of the conveyed sheet is reversed, and is conveyed to the double-sided conveyance path 317. Due to the reverse path 316 and the double-sided conveyance path 317, a surface (first surface) of the sheet on which the image is formed is reversed. The sheet is conveyed by the double-sided conveyance path 317 to the conveyance path 303, and, by passing through the secondary transfer roller 309 and the fixing unit 229, an image is formed on the second surface, which is different from the first surface on which the image has been formed.

Figure 5:
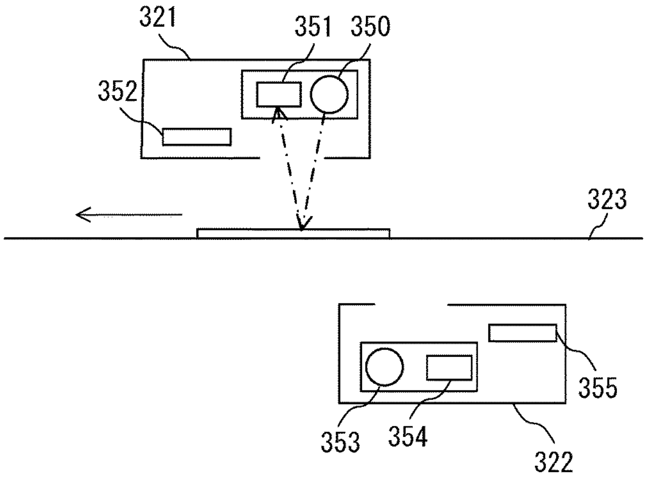
FIG. 5 is an explanatory diagram of a CIS.

In a case where a single-sided printing is performed, or in a case where images have been formed on both sides in the double-sided printing, the sheet is conveyed to the conveyance path 315. The conveyance path 323 is arranged downstream of the conveyance path 315 in the conveyance direction. As the image reading unit 231, Contact Image Sensor (CIS) 321 and 322 are arranged with the conveyance path 323 in between. FIG. 5 is an explanatory diagram of the CIS 321 and 322. The CIS 321 is an optical sensor that reads the image of a front surface of the sheet which is conveyed through the conveyance path 323. The CIS 322 is an optical sensor that reads the image of a back surface of the sheet which is conveyed through the conveyance path 323.

The CIS 321 includes an LED (Light Emitting Diode) 350 as a light source, a reading sensor 351 as a light receiving unit, and a white reference plate 352. The LED 350 irradiates the upper surface of the sheet with light at the time when the sheet conveyed through the conveyance path 323 reaches a reading position. The reading sensor 351 includes a plurality of light receiving elements (photoelectric conversion elements) in a direction orthogonal to the sheet conveyance direction. Therefore, a direction orthogonal to the conveyance direction of the sheet is a main scanning direction of the CIS 321. The reading sensor 351 receives the light reflected by the sheet. The plurality of light receiving elements of the reading sensor 351 output, based on the intensity of the received reflected light, output values (electric signals). Output signals output from the plurality of light receiving elements are transmitted to the CPU 222. The values of the signal differ according to density of the read image. In this way, the image formed on the sheet is read.

The white reference plate 352 is a calibration member (reference member) which is used when executing shading correction of CIS 321. In a case where a shading correction is performed, the LED 350 and the reading sensor 351 move to a position where reading of the white reference plate 352 can be performed. Alternatively, at the time of executing the shading correction, the white reference plate 352 is moved to a reading position of the LED 350 and the reading sensor 351. The shading correction of the CIS 321 is performed based on the reading result of the white reference plate 352. Therefore, the CIS 321 cannot read the image formed on the sheet at the time of shading correction.

Similar to the CIS 321, the CIS 322 includes an LED 353, a reading sensor 354, and a white reference plate 355. The CIS 322 operates, in the same manner as the CIS 321, to read an image formed on the back surface of the sheet at the time when the sheet conveyed through the conveyance path 323 reaches a reading position. Instead of the CIS 321 and the CIS 322, the image reading unit 231 also can be configured by a CCD or a CMOS sensor.

The printing apparatus 107 of the present embodiment can form the adjustment image for adjusting an image forming condition on both surfaces of the sheet. The sheet on which the adjustment image was formed is referred to as an adjustment chart. The printing apparatus 107 creates the adjustment chart and reads the adjustment image by the CIS 321 and the CIS 322. The reading results (reading data) of the adjustment chart by the CIS 321 and the CIS 322 are stored in the memory 223. The CPU 222 refers to the memory 223 and analyzes the reading data read by the CIS 321 and the CIS 322 to feed back the result of the analysis to the image forming condition. Thereby the image forming condition is adjusted.

For example, as to the YMCK contact state and a K contact state, the geometric characteristics of the image formed on the sheet by the printing apparatus 107 are different from each other. The printing apparatus 107 creates the adjustment chart of the geometric characteristic, and detects the geometric characteristic based on the reading result (reading data) read by the CIS 321 and the 322. The CPU 222 performs an affine transformation to the image data to obtain an ideal geometric characteristic from the detected geometric characteristic. The printing apparatus 107 can control, by forming the image on the sheet based on the image data transformed by the CPU 222, the geometric characteristic of the image formed on the sheet. Thereby, the printing apparatus 107 can control the fluctuation of the geometric characteristic of an image.

Instead of the image for detecting the geometric characteristic, the adjustment image formed on the adjustment chart may be an image for detecting an image density, or an image for detecting a color misregistration. In a case where the adjustment image for detecting the image density is formed, the CPU 222 generates the image forming condition for suppressing the fluctuation of the image density based on the reading result (reading data) of the CIS 321 (or the CIS 322). The image density of the image formed by the printing apparatus 107 forms is adjusted to an ideal image density by controlling, by the CPU 222, the intensity of a light source of the exposure unit 227 based on the image forming condition. Alternatively, the CPU 222 generates a one-dimensional tone correction table for suppressing the fluctuation of the image density based on the reading result of the CIS 321 (or the CIS 322). The CPU 222 converts the image data based on the tone correction table. The printing apparatus 107 forms the image on the sheet based on the image data transformed by the CPU 222. Thus, the density of the image formed by the printing apparatus 107 is controlled to be the ideal image density.

Further, in a case where the adjustment image for detecting the color misregistration is formed, the CPU 222 detects the color misregistration based on the reading result (reading data) of the CIS 321 (or the CIS 322). The CPU 222 controls the position of the image formed on a photosensitive member by the exposure unit 227 based on the detected color misregistration. Thus, the CPU 222 corrects the image forming conditions of each color so that the color misregistration may decrease.

The adjustment image may be of a type that is printed on a sheet, as the adjustment chart, which is different from a sheet on which a user image is to be formed, or of a type that is printed on the same sheet on which the user image is to be formed. In a case where the adjustment image is printed as the adjustment chart, the CPU 222 forms, from the image data obtained from the client PC 103, the adjustment chart such that the adjustment chart is inserted, every time a predetermined number of N sheets are printed, between the Nth page on which the user image is formed and (N+1)th page on which the user image is formed. In a case where the adjustment image is formed on the same sheet on which the user image is to be formed, it is desirable to form the adjustment image in a cutting area (outside of a user image forming area) of the sheet. This is because the adjustment image is cut to be removed from the printed matter. Here, the user image is an image included in the image data transferred from the client PC 103.

The adjustment chart is discharged such that it may not be mixed in the printed matter (sheet bundle of the sheet on which the user image was formed) according to the print job. In order to achieve the above, the printing apparatus 107 includes a flapper 324, a discharge path 326, a conveyance sensor 327, and a discharge tray 328. The adjustment chart from which the image (adjustment image) has been read by the CIS 321 and the CIS 322 is conveyed by the flapper 324 to the discharge path 326. The sheet conveyed to the discharge path 326 is discharged to the discharge tray 328.

In a case where the sheet is not the adjustment chart, the sheet is conveyed by the flapper 324 from the conveyance path 323 to a downstream conveyance path 325. The sheet conveyed to the downstream conveyance path 325 is received and delivered to a finisher 109. In a case where the printing apparatus 107 receives a notification of an occurrence of a conveyance jam from the finisher 109, the printing apparatus 107 switches the flapper 324 to the discharge path 326 side, regardless of whether the sheet is the adjustment chart or not. Thus, all the sheets in the printing apparatus (residual sheet) are discharged to the discharge tray 328. By discharging the residual sheet to the discharge tray 328, the load of jam processing for the user before completing printing is reduced.

On the finisher 109, the sheet delivered from the printing apparatus 107 can be stacked. The finisher 109 includes a conveyance path 331 and a stack tray 332 for stacking sheets. Conveyance sensors 333, 334, 335, and 336 are arranged in the conveyance path 331. The sheet conveyed from the printing apparatus 107 is loaded in the stack tray 332 via the conveyance path 331. The conveyance sensors 333, 334, 335, and 336 detect passing of the sheet conveyed in the conveyance path 331. In a case where a leading edge or a trailing edge of the sheet in the conveying direction is not detected by the conveyance sensors 333, 334, 335, and 336 even after a lapse of a predetermined time from the start of conveying the sheet, the CPU 242 determines that a conveyance jam (conveyance failure) has occurred in the finisher 109. In this case, the CPU 242 notifies the printing apparatus 107 that the conveyance jam has occurred.

<Correction Value Generation Method of Front and Back Printing Positions>

Different types of sheets, even if the basis weight is the same, have different shrinkage characteristics after passing the fixing unit 229 because of their different moisture absorption states and physical property characteristics. In order to improve the correction accuracy of the image forming condition (geometric characteristic), the image forming apparatus 101 needs to generate the correction value of the image forming condition (geometric characteristic) for each type of the sheet to be used. In the present embodiment, the image forming apparatus 101 generates the correction value of the printing position for each type of the sheet to be used in order to increase the printing position accuracy of the front and back surfaces.

FIGS. 6A-6D are diagrams of a setting screen for registering the sheet which can be used for printing. The image forming apparatus 101 can set up the image forming condition suitable for the sheet since a user registers a sheet which can be used for printing. The setting screen is displayed on the display 225 by the CPU 222. The user can register the sheet from the setting screen by the operation unit 224.

Figure 6A:
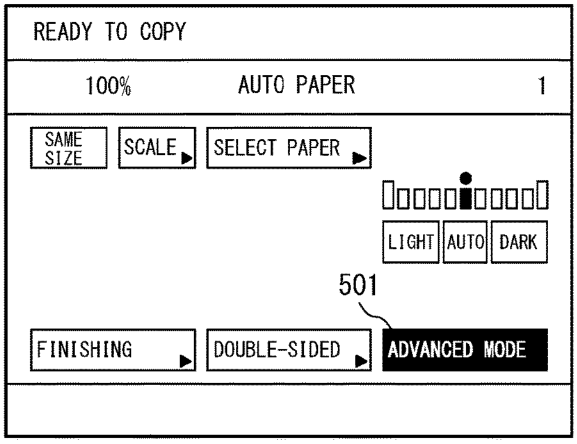
FIGS. 6A-6D are explanatory diagrams of a setting screen for registering a sheet.
Figure 6B:
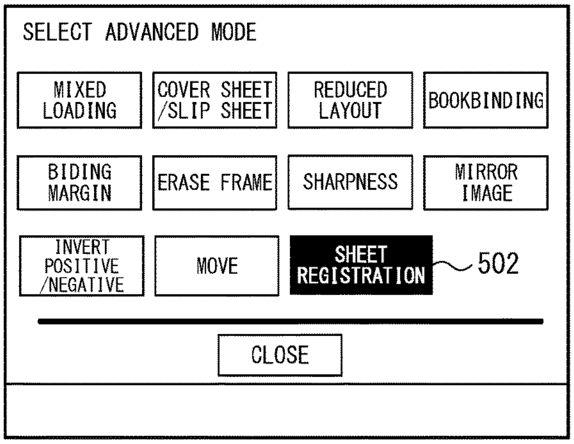
Figure 6C:
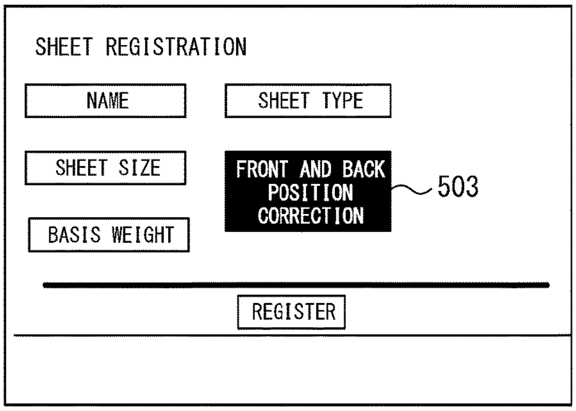
Figure 6D:
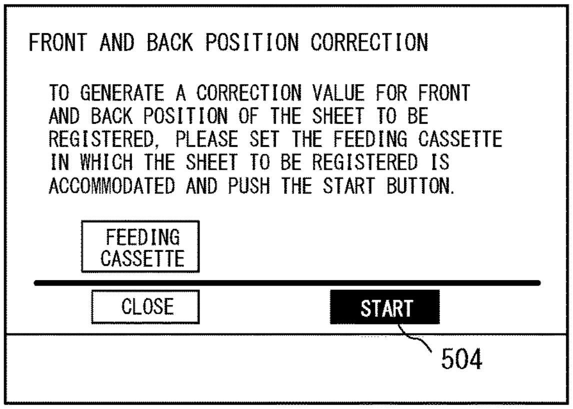

FIG. 6A illustrates an initial screen. In a case where the user selects a soft key "ADVANCED MODE" button 501 in the initial screen, the CPU 222 displays an application mode selection screen, illustrated in FIG. 6B, on the display 225. In a case where the user selects a soft key "SHEET REGISTRATION" button 502 in the advanced mode selection screen, the CPU 222 displays the sheet registration screen, illustrated in FIG. 6C, on the display 225. On the sheet registration screen, it is possible to set basis weight, a size, and a name of the sheet to be registered, and a sheet type such as regular paper and coated paper. In a case where printing with increased printing position accuracies of the front and back surfaces, "FRONT AND BACK POSITION CORRECTION" button 503, which is a soft key, is selected from the sheet registration screen. In a case where "FRONT AND BACK POSITION CORRECTION" button 503 is selected, automatic adjustment of the printing position of the front and back surface is enabled. In a case where "FRONT AND BACK POSITION CORRECTION" button 503 is selected, the CPU 222 displays the front and back position correction screen, illustrated in FIG. 6D, on the display 225.

The user can select a feeding cassette for the sheet registration by selecting "FEEDING CASSETTE" button, which is a soft key, from the front and back position correction screen. In a case where "START" button 504 is selected, the front and back position correction is started. In addition, in a case where the user decided to not improve the printing position accuracy for the front and back surface, the user does not need to push "FRONT AND BACK POSITION CORRECTION" 503.

Figure 7:
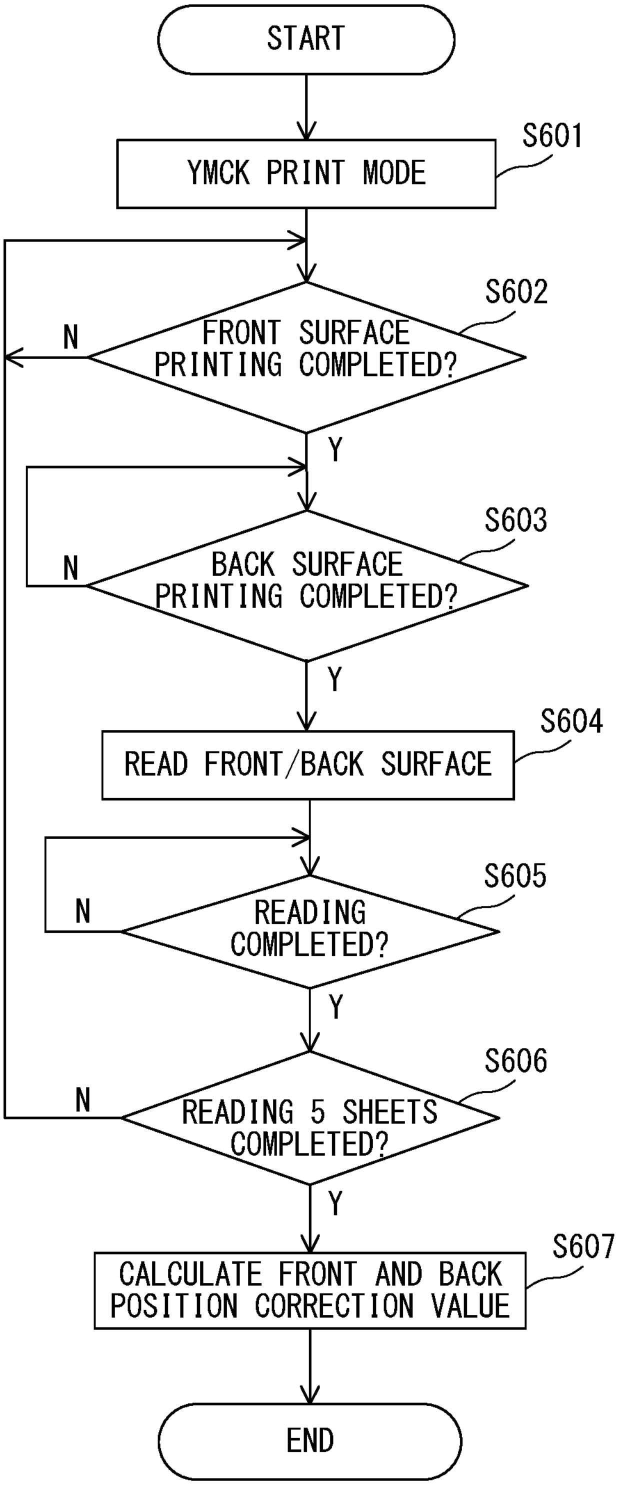
FIG. 7 is a flow chart representing a process for acquiring a front and back position correction value for front and back surfaces.

FIG. 7 illustrates a flow chart representing a process for acquiring a correction value of the front and back printing position on the sheet to be registered (front and back position correction value). In a case where "START" button 504 is selected from the front and back position correction screen illustrated in FIG. 6D, this process is started.

CPU 222 starts a printing operation to a predetermined number of sheets in the YMCK print mode (STEP S601). In the present embodiment, double-sided printing of the adjustment image for the image forming condition (in this case, a printing position of the front and back surface) is started for five sheets. FIG. 8 illustrates an exemplary diagram of the adjustment image. The adjustment image has the same image on the front surface and the back surface, and is an image of a shape of "V" character arranged in the four corners of the sheet.

At first, the CPU 222 performs printing operation of the adjustment image on the front surface of the sheet (STEP S602: N). After completing the printing of the adjustment image on the front surface (STEP S602: Y), the CPU 222 performs printing operation of the adjustment image to the back surface of the sheet (STEP S603: N). After completing the printing of the adjustment image on the back surface (STEP S603: Y), the double-sided printing of the adjustment image is completed.

Then, the CPU 222 reads the adjustment images printed by the CIS 321 and the CIS 322 on the front surface and the back surface of the sheet (STEP S604). After completing the reading of the adjustment images on both of the front surface and the back surface (STEP S605: Y), the CPU 222 determines whether the adjustment images have been read from a predetermined number of sheets or not (STEP S606). Here, it is decided whether the adjustment image has been read from both surfaces of five sheets. In a case where the reading of the adjustment images from both surfaces of the five sheets is not completed (STEP S606: N), the CPU 222 performs the process after STEP S602, in order to perform printing of the adjustment image on both surfaces of the following sheets, and the reading of the adjustment images. Actually, five adjustment charts are formed continuously.

In a case where the reading of the adjustment images from both surfaces of the predetermined number of sheets (five sheets) is completed (STEP S606: Y), the CPU 222 calculates the front and back position correction value in YMCK print mode based on the reading results of the adjustment images of both surfaces of the predetermined number of read sheets (five sheets) (STEP S607). The CPU 222 stores the calculated front and back position correction value in the memory 223 in association with the type of the sheet. A process for acquiring the front and back position correction value is completed as described above. At the time of double-sided printing, the CPU 222 corrects the image forming condition with the front and back position correction value associated with the type of the sheet to be printed, and performs double-sided printing of the image under the corrected image forming condition. Thereby, the position of the image printed on each of the front and back surfaces is optimally corrected.

FIGS. 9A and 9B are explanatory diagrams of a method of calculating the front and back position correction value. Measurement positions of the sheet by the CIS 321 and the CIS 322 are illustrated in FIGS. 9A and 9B. In the following explanation, the main scanning direction is a direction in which the photosensitive drums 340Y, 340M, 340C, and 340K are scanned by the exposure unit 227 by a laser light at the time of image forming. The sub-scanning direction is a direction orthogonal to the main scanning direction, and is the conveyance direction of the sheet. The front and back position correction values of the present embodiment are, for each of the front and back surfaces of the sheet, a main scanning magnification correction value, a sub-scanning magnification correction value, a correction value of a main scanning direction image writing start position, and a correction values in a sub-scanning direction writing start position. The main scanning magnification correction value is an image magnification correction value in the main scanning direction. The sub-scanning magnification correction value is an image magnification correction value in the sub-scanning direction. The correction value of the main scanning writing start position is an image writing start position in the main scanning direction. The correction value of the sub-scanning writing start position is an image writing start position in the sub-scanning direction.

The image magnification correction value is explained. In a case where the double-sided printing is performed, the size of the sheet becomes small since the sheet is heated by the fixing unit 229 in the fixing process of the image formed of the front surface. Therefore, the image printed on the front surface also becomes small at the same ratio. On the other hand, since the size of the sheet has become small in the fixing process on the front surface, as to the sheet after the fixing process on the back surface, the size change of the sheet is very small. Therefore, the image printed on the back surface does not become small. Thus, the image printed on the back surface becomes large as compared to the image printed on the front surface.

In order to correct the printing position of the image accurately both on the front surface and the back surface, it is necessary to correct the magnifications of the image sizes of the front surface and the back surface to make the size of the image on the front surface the same as the size of the image on the back surface. The correction value of the magnification of the image size (magnification correction value) is derived based on a distance Len (a-b) between an apex a and an apex b of "V" shaped marks, and the distance Len (b-c) of between the apex b and an apex c of "V" shaped marks, as illustrated in FIG. 9A. The distance Len (a-b) and the distance Len (b-c) of the front surface are determined based on the reading result of the adjustment image of the front surface by CIS 321. The distance Len (a-b) and the distance Len (b-c) of the back surface are determined based on the reading result of the adjustment image of the back surface by CIS 322.

The CPU 222 calculates the magnification correction value in the main scanning direction by the following formula such that the distance Len (a-b) serve as a length Len_main (not illustrated) in the main scanning direction of the sheet, which is used as a reference.

$$\text{Main scanning magnification correction value}=\text{Len\_main}/\text{Len}(a-b)$$

The CPU 222 calculates the magnification correction value in the sub-scanning direction by the following formula such that the distance Len (b-c) matches a length Len_sub (not illustrated) in the sub-scanning direction of the sheet, which is used as a reference.

$$\text{Sub-scanning magnification correction value}=\text{Len\_sub}/\text{Len}(b-c)$$

The correction value of the main scanning image writing start position for correcting the writing start position of the image in the main scanning direction is explained. The correction value of the main scanning image writing start position is a value for correcting the image writing start position in the main scanning direction such that the distance Len (side-a) and the distance Len (side-b) are the same distance. It is noted that Len (side-a) is a distance from a sheet end to the apex a in the main scanning direction, and the distance Len (side-b) is a distance from the sheet end to an apex b in the main scanning direction, as illustrated in FIG. 9B. By using the correction value of the main scanning image writing start position, the position of the image in the main scanning direction is corrected to be in the center of the sheet in the main scanning direction. The CPU 222 calculates the correction value of a main scanning direction writing start position using the following formula.

$$\text{Correction value of the main scanning direction writing start position}=(-1\times(\text{Len}(\text{side-}a)-\text{Len}(\text{side-}b))/2)+(-1\times(\text{Len\_main}-\text{Len}(a-b))/2))$$

In a case where the correction value of the main scanning direction writing start position is negative, the image writing start time in the main scanning direction is corrected such that a main scanning direction writing start time is earlier than a reference timing. In a case where the correction value is positive, the image writing start time in the main scanning direction is corrected such that the main scanning direction writing start time is later than the reference timing.

The correction value of the sub-scanning image writing start position for correcting the writing start position of the image in the sub-scanning direction is explained. The correction value of the sub-scanning image writing start position is a value for correcting the image writing start position in the sub-scanning direction such that the distance Len (top-a) and the distance Len (tail-d) are the same distance. It is noted that Len (top-a) is the distance from a sheet end to the apex a in the sub-scanning direction, and the distance Len (tail-d) is the distance from the sheet end to the apex d in the sub-scanning direction, as illustrated in FIG. 9B. By using the correction value of the sub-scanning image writing start position, the position of the image in the sub-scanning direction is corrected to be in the center of the sheet in the sub-scanning direction. The CPU 222 calculates the correction value of the sub-scanning direction writing start position using the following formula.

$$\text{Correction value of the sub-scanning direction writing start position}=(-1\times(\text{Len}(\text{top-}a)-\text{Len}(\text{tail-}d))/2)+(-1\times(\text{Len\_sub}-\text{Len}(b-c))/2))$$

In a case where the correction value is negative, the image writing start time in the sub-scanning direction is corrected such that the sub-scanning direction writing start time is earlier than the reference timing. In a case where the correction value is positive, the image writing start time in the sub-scanning direction is corrected such that the sub-scanning direction writing start time is later than the reference timing.

The CPU 222 generates, by the process illustrated in STEP S607, for each of the front and back surfaces of the sheet, the main scanning magnification correction value, the sub-scanning magnification correction value, the correction value of the main scanning direction image writing start position, and the correction values in the sub-scanning direction writing start position, as the front and back position correction values. The CPU 222 corrects the image forming conditions for the front and back surfaces of the sheet by the main scanning magnification correction value, the sub-scanning magnification correction value, the correction value of the main scanning direction image writing start position, and the correction values in the sub-scanning direction writing start position. By printing the image on the sheet according to the corrected image forming conditions, the printing position accuracy is improved for each of the front surface and the back surface.

<Registration Information of Sheet>

Figure 10:
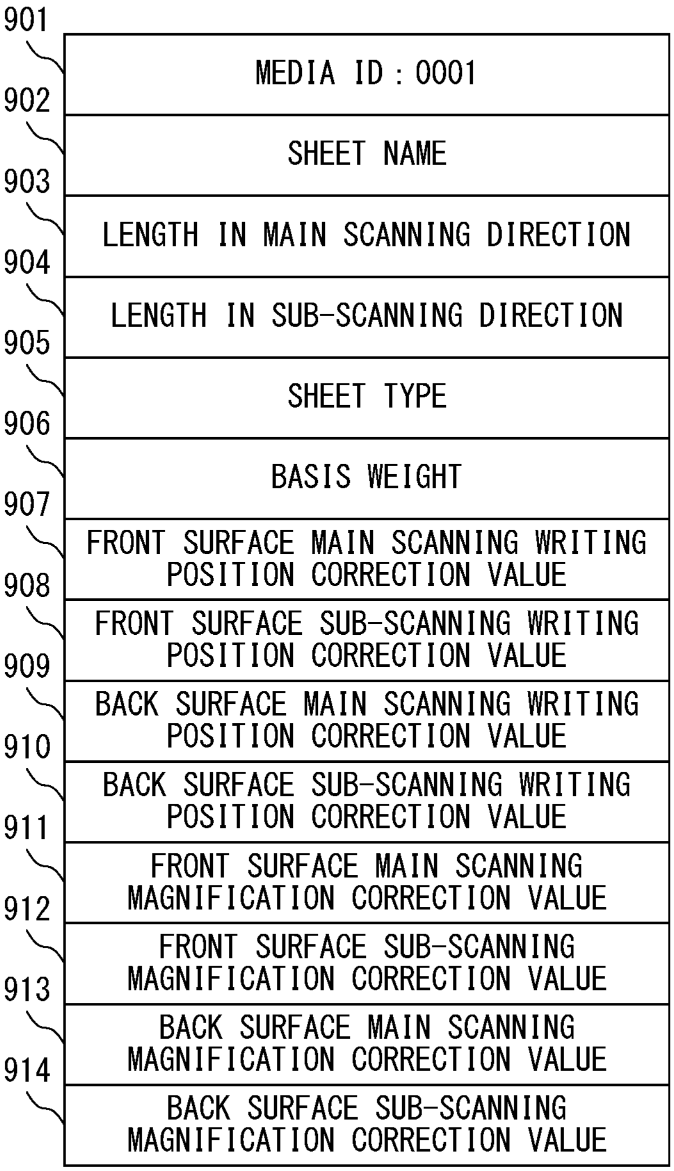
FIG. 10 is an exemplary diagram illustrating registration information of a sheet.

FIG. 10 illustrates the registration information including information concerning features of the sheet. The registration information of the sheet is registered by the user from the setting screens illustrated in FIG. 6A-FIG. 6D, and is stored in the memory 223. The registration information of the sheet includes media ID 901 to identify the registered sheet, a sheet name 902 of the sheet, a length of the sheet in the main scanning direction 903, a length of the sheet in the sub-scanning direction 904, a sheet type 905, and basis weight 906 of the sheet. Further, the registration information of the sheet includes the front and back position correction value calculated in the process illustrated in FIG. 7. The front and back position correction value includes, as to the front surface, a front surface main scanning writing position correction value 907, a front surface sub-scanning writing start position correction value 908, a front surface main scanning magnification correction value 911, and a front surface sub-scanning magnification correction value 912. Further, the front and back position correction value includes, as to the back surface, a back surface main scanning writing position correction value 909, a back surface sub-scanning writing start position correction value 910, a back surface main scanning magnification correction value 913, and a back surface sub-scanning magnification correction value 914.

<Print Mode Selection>

Figure 11:
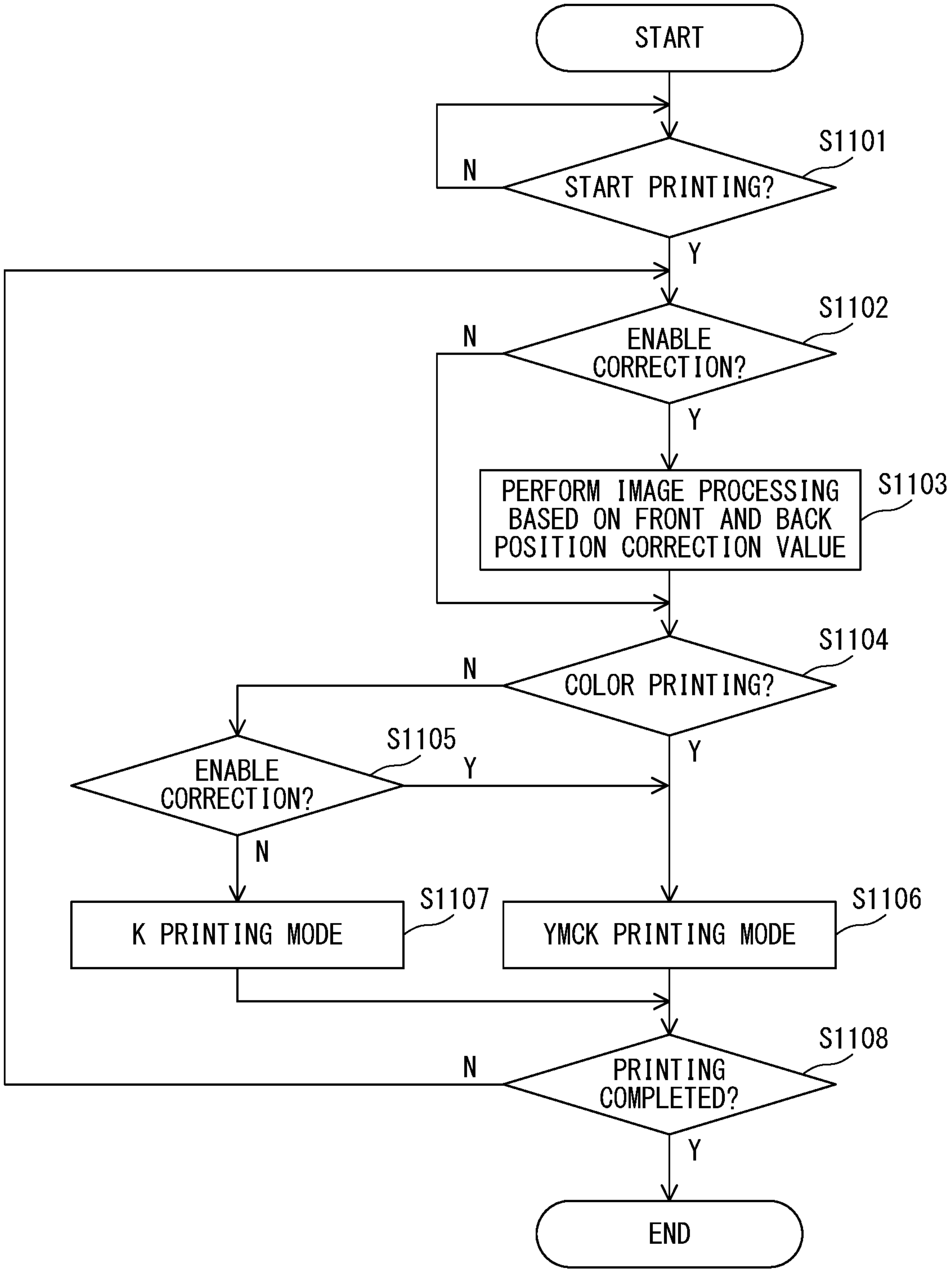
FIG. 11 is a flowchart illustrating a printing process including a printing mode selection process.

FIG. 11 is a flowchart illustrating a printing process including a printing mode selection process. The print mode may be automatically selected by the image forming apparatus 101.

The CPU 222 starts a printing operation according to the print job (STEP S1101: Y). Here, the print job includes print mode information which indicates whether it is a monochrome image printing or is a color image printing. The CPU 222 determines whether the front and back position correction is enabled or not (STEP S1102). In the present embodiment, the CPU 222 determines whether the front and back position correction is enabled or not based on whether the front and back position correction is set (registered) in the registration information of the sheet to be used for printing. The decision of whether the front and back position correction is enabled or not may be performed by using a dedicated setting switch for setting enabling/disabling of the front and back position correction.

In a case where the front and back position correction is enabled (STEP S1102: Y), the CPU 222 performs image processing that is based on the front and back position correction value to the image data to correct the geometric characteristic of the image formed on the sheet using the front and back position correction value (STEP S1103). In a case where the front and back position correction is disabled, (STEP S1102: N), or after the image processing that is based on the front and back position correction value has been performed, the CPU 222 determines whether to perform color printing according to the print mode information of the printing job (STEP S1104). In a case where the print mode information instructs to print a monochrome image (i.e., the color printing is not performed) (STEP S1104: N), the CPU 222 determines whether the front and back position correction is enabled or not (STEP S1105).

In a case where the front and back position correction is enabled (STEP S1105: Y), the CPU 222 selects the YMCK print mode as the print mode even if the print mode information indicates the printing of the monochrome image (STEP S1106). That is, in a case where the front and back position correction is enabled at the time of the printing of the monochrome image, the CPU 222 sets the printing mode as the YMCK printing mode in which all the photosensitive drums 340Y, 340M, 340C, and 340K are in contact with the intermediate transfer belt 308.

In a case where the front and back position correction is disabled (STEP S1105: N), the CPU 222 selects the K print mode as the print mode (STEP S1107). That is, in a case where the front and back position correction is disabled at the time of printing of the monochrome image, the CPU 222 separates the photosensitive drums 340Y, 340M, and 340C from the intermediate transfer belt 308 and sets the printing mode as the K printing mode in which only the photosensitive drums 340K is in contact with the intermediate transfer belt 308.

In a case where the print mode information indicates the printing of the color image (perform the color printing) (STEP S1104: Y), the CPU 222 selects the YMCK print mode as the print mode (STEP S1106). That is, in a case where the front and back position correction is enabled at the time of the printing of the color image, the CPU 222 sets the printing mode as the YMCK printing mode in which all the photosensitive drums 340Y, 340M, 340C, and 340K are in contact with the intermediate transfer belt 308. After determining the print mode, image forming on the photosensitive member is started. In a case where the correction is enabled, the image forming is performed such that the above-mentioned user image and the adjustment image, which are included in the print job, are transferred on the same sheet. In a case where the correction is not enabled, the user image is formed on the photosensitive member without forming the adjustment image. As described above, instead of a configuration in which the user image and the adjustment image are formed on the same sheet, each time the user image is formed on a predetermined number of sheets, a configuration in which the adjustment image is formed, each time the user image is formed on a given number of sheets, on another sheet on which no user image is formed may be employed.

The CPU 222 determines whether the printing according to the print mode is completed or not (STEP S1108). According to the print mode, the toner image is transferred onto the intermediate transfer belt 308 as follows. In a case where the print mode is the K print mode and the front and back position correction is enabled, the intermediate transfer belt 308 is in contact with the photosensitive drums 340Y, 340M, 340C, and 340K, however, the toner image is formed only on the photosensitive drum 340K, and is transferred onto the intermediate transfer belt 308. In a case where the print mode is the K print mode and the front and back position correction is disabled, the intermediate transfer belt 308 is in contact with only the photosensitive drum 340K, and the toner image is formed only on the photosensitive drum 340K, and is transferred onto the intermediate transfer belt 308. In a case where the print mode is the YMCK print mode, the intermediate transfer belt 308 is in contact with the photosensitive drums 340Y, 340M, 340C, and 340K, and the toner image is formed on the photosensitive drums 340Y, 340M, 340C, and 340K, and is transferred onto the intermediate transfer belt 308.

In a case where the printing is not completed (STEP S1108: N), the CPU 222 returns to the process of STEP S1102 and performs the printing process to form the image on the next page. In a case where the printing is completed (STEP S1108: Y), the CPU 222 completes the processing.

The image forming apparatus 101 of the present embodiment as described above automatically selects, in a case where high printing position accuracy is required for the images of the front and back surfaces at the time of the double-sided printing of the monochrome image, the print mode to be in the YMCK contact state. The image forming apparatus 101 automatically selects, in a case where high printing position accuracy is not required for the images of the front and back surfaces at the time of the printing of the monochrome image, the print mode to be in the K contact state.

The print mode to be in the YMCK contact state is selected in a case where the double-sided printing of the monochrome image is performed in a state where the front and back position correction is enabled. Therefore, the correction accuracy of the printing position of the front and back surface can be increased by using the front and back position correction value acquired based on a reading result of the adjustment image printed in the YMCK contact state. At the time of the printing of the monochrome image in a state where the front and back position correction is not enabled, the photosensitive drums 340Y, 340M, and 340C of Y, M, and C, respectively, are separated from the intermediate transfer belt 308. Therefore, it is possible to suppress the progression of aging variation of the photosensitive drums 340Y, 340M, and 340C. Thus, the image forming apparatus 101 of the present embodiment can reduce, as to the images on the front and back surfaces at the time of double-sided printing, loss of the correction accuracy of the geometric characteristics.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-101298, filed Jun. 23, 2022, which is hereby incorporated by reference herein in its entirety.

What is claimed is:

1. An image forming apparatus comprising:

a first image forming unit configured to form a first image of a chromatic color on a first image bearing member;

a second image forming unit configured to form a second image of an achromatic color on a second image bearing member;

an intermediate transfer member onto which the first image formed on the first image bearing member and the second image formed on the second image bearing member are to be transferred;

a transfer unit configured to transfer an image transferred onto the intermediate transfer member onto a sheet;

a fixing unit configured to fix the image transferred onto the sheet to the sheet;

a reading unit configured to read the image fixed to the sheet;

a switching unit configured to switch a first mode and a second mode, the first mode being a mode in which the intermediate transfer member and both the first image bearing member and the second image bearing member are in a contact state, and the second mode being a mode in which the first image bearing member and the intermediate transfer member are separated and the second image bearing member and the intermediate transfer member are in a contact state; and a controller configured to perform, in a case where an adjustment image for adjusting an image forming position is fixed to the sheet and the adjustment image fixed to the sheet is read by the reading unit, a determining process to determine a correction value for correcting the image forming position based on a reading result of the reading unit, wherein the controller is configured to form, in a case where the controller is set to form the second image without forming the first image and the controller is set to perform the determining process, the second image in the first mode, and wherein in a case where the controller is set to form the second image on both surfaces of the sheet without forming the first image and the controller is set to perform the determining process, the controller is configured to form the adjustment image on both surface of the sheet in the determining process.

2. The image forming apparatus according to claim 1, wherein the reading unit includes a first reading unit configured to read the adjustment image transferred onto a first surface of the sheet and a second reading unit configured to read the adjustment image transferred onto a second surface of the sheet.

3. The image forming apparatus according to claim 1, wherein, in the determining process, the controller is configured to determine the correction value based on the reading result of the reading unit of the adjustment image transferred onto each of a predetermined number of sheets read by the reading unit.

4. The image forming apparatus according to claim 1, wherein the controller is configured to control forming of the second image on the second image bearing member based on the determined correction value.

5. The image forming apparatus according to claim 1, further comprising a memory configured to store information concerning a feature of the sheet, wherein the controller is configured to store the determined correction value in the memory.

6. The image forming apparatus according to claim 5, wherein the controller is configured to store the correction value in the memory for each type of the sheet.

7. The image forming apparatus according to claim 5, wherein the controller is configured to perform the determining process in a case where the correction value corresponding to the type of the sheet to be used in the image forming is stored in the memory.

8. The image forming apparatus according to claim 1, further comprising a switch configured to set whether to perform the determining process or not, and the controller is configured to determine whether to perform the determining process based on an input state of the switch.

9. The image forming apparatus according to claim 1, wherein the correction value includes information for correcting the image forming position with respect to the sheet.

10. The image forming apparatus according to claim 1, wherein the correction value includes information to correct a magnification of the image.

11. The image forming apparatus according to claim 1, wherein a setting to form the second image without forming the first image is a setting for forming a monochrome image.

12. An image forming apparatus that forms an image on a sheet, the image forming apparatus comprising:

a first image forming unit configured to form a color image on a first image bearing member;

a second image forming unit configured to form a black image on a second image bearing member;

an intermediate transfer member onto which the color image formed on the first image bearing member and the black image formed on the second image bearing member are to be transferred;

a transfer unit configured to transfer an image transferred onto the intermediate transfer member onto a sheet;

a reading unit configured to read an adjustment image on a sheet;

a switching unit configured to switch a first mode and a second mode, the first mode being a mode in which the intermediate transfer member and both the first image bearing member and the second image bearing member are in a contact state, and the second mode being a mode in which the first image bearing member and the intermediate transfer member are separated and the second image bearing member and the intermediate transfer member are in a contact state; and a controller configured to:

control the image forming apparatus to form the adjustment image in the first mode;

generate, based on a reading results of the adjustment image read by the reading unit, an adjustment value for adjusting a position of the image to be formed by the image forming apparatus;

determine whether to adjust the position of the image to be formed based on the adjustment value;

control the switching unit to form the black image in the first mode in a case where it is determined that, in a job in which a black image is formed on a sheet without forming the color image, the position where the black image is to be formed should be adjusted based on the adjustment value.

13. The image forming apparatus according to claim 12, wherein the controller is configured to control the switching unit to form the black image in the second mode in a case where it is not determined, in the job in which a black image is formed on a sheet without forming the color image, to adjust the position where the black image is to be formed based on the adjustment value.

14. The image forming apparatus according to claim 12, wherein the controller is configured to determine, based on registration information associated with the sheet used in the job, whether or not to adjust the position where the black image is to be formed in the job based on the adjustment value, and wherein the registration information includes information indicating whether or not to adjust, based on the adjustment value, the position of the image to be formed.

15. The image forming apparatus according to claim 12, further comprising a switch to be used for inputting user indication information indicating that the position of the image to be formed should be adjusted based on the adjustment value.

16. The image forming apparatus according to claim 12, the controller generates the adjustment value based on a reading result of the adjustment image formed in a plurality of sheets.

17. The image forming apparatus according to claim 12, further comprising:

a tray in which the sheet on which the image is formed is loaded; and a conveyance path through which the sheet is conveyed to the tray from a transfer position where the transfer unit transfers the image onto the sheet;

wherein the reading unit is configured to read the adjustment image with the sheet being conveyed through the conveyance path.

18. The image forming apparatus according to claim 12, wherein the adjustment value is generated in relation to a type of the sheet.

* * * * *